United States Patent [19]

Gosine

[11] Patent Number: 5,735,056
[45] Date of Patent: Apr. 7, 1998

[54] MODULAR TOOLING SYSTEM FOR USE WITH A GAUGING MACHINE

[76] Inventor: Gary G. Gosine, 831 Redding, Birmingham, Mich. 48009-4820

[21] Appl. No.: 538,236

[22] Filed: Oct. 3, 1995

[51] Int. Cl.[6] .................................................. B23Q 16/00
[52] U.S. Cl. .......................................... 33/573; 33/568
[58] Field of Search .......................... 33/568, 567, 567.1, 33/573; 269/100, 101, 287, 309

[56] References Cited

U.S. PATENT DOCUMENTS

| | | | |
|---|---|---|---|
| 3,723,927 | 3/1973 | Blakely et al. | 33/567 |
| 3,974,569 | 8/1976 | Albertazzi | 33/143 |
| 4,310,963 | 1/1982 | Blumle | 269/900 |
| 4,419,827 | 12/1983 | Gluza | 33/174 |
| 4,593,476 | 6/1986 | Clark et al. | 33/529 |
| 4,598,480 | 7/1986 | Cukelj | 33/169 |
| 4,680,865 | 7/1987 | Danielli et al. | 33/143 |
| 4,711,437 | 12/1987 | Longenecker et al. | 269/100 |
| 4,834,358 | 5/1989 | Okolischan et al. | 269/309 |
| 4,848,004 | 7/1989 | Wilkins | 33/503 |
| 4,848,005 | 7/1989 | Ercole et al. | 33/568 |
| 5,107,599 | 4/1992 | Marincic et al. | 33/573 |
| 5,193,286 | 3/1993 | Collier | 33/551 |
| 5,255,901 | 10/1993 | Rottler | 269/309 |
| 5,279,171 | 1/1994 | Sola et al. | 74/89 |

OTHER PUBLICATIONS

Witte Product Catalog, 96 pgs. (Apr. 1992).
General Motors Truck and Bus Group Brochure entitled "Universal Gauging System" 31 pgs. (undated).
Heckler & Koch Gruppe Product Brochure entitled "Modular Measuring System", 6 pgs. (1989).
DEA Product Brochure entitled "Misttral The Slant Bridge Machine", 6 pgs. (Apr., 1993).
QU–CO Product Brochure entitled "Modular Fixturing System", 120 pgs. (undated).

*Primary Examiner*—G. Bradley Bennett
*Attorney, Agent, or Firm*—Harness, Dickey & Pierce, P.L.C.

[57] ABSTRACT

A module tooling system for use with a gauging machine is provided. The system includes a plurality of cooperating components for providing flexibility to accommodate an infinite number of manufactured for measuring. In a preferred embodiment, the system includes a central module including a male flange portion. The plurality of cooperating modules each include a similar male flange portion and further include a female flange portion. The female flange portion is adapted for releasable attachment to the male flange portion of the central module or the male flange portion of one of the other cooperating modules.

20 Claims, 9 Drawing Sheets

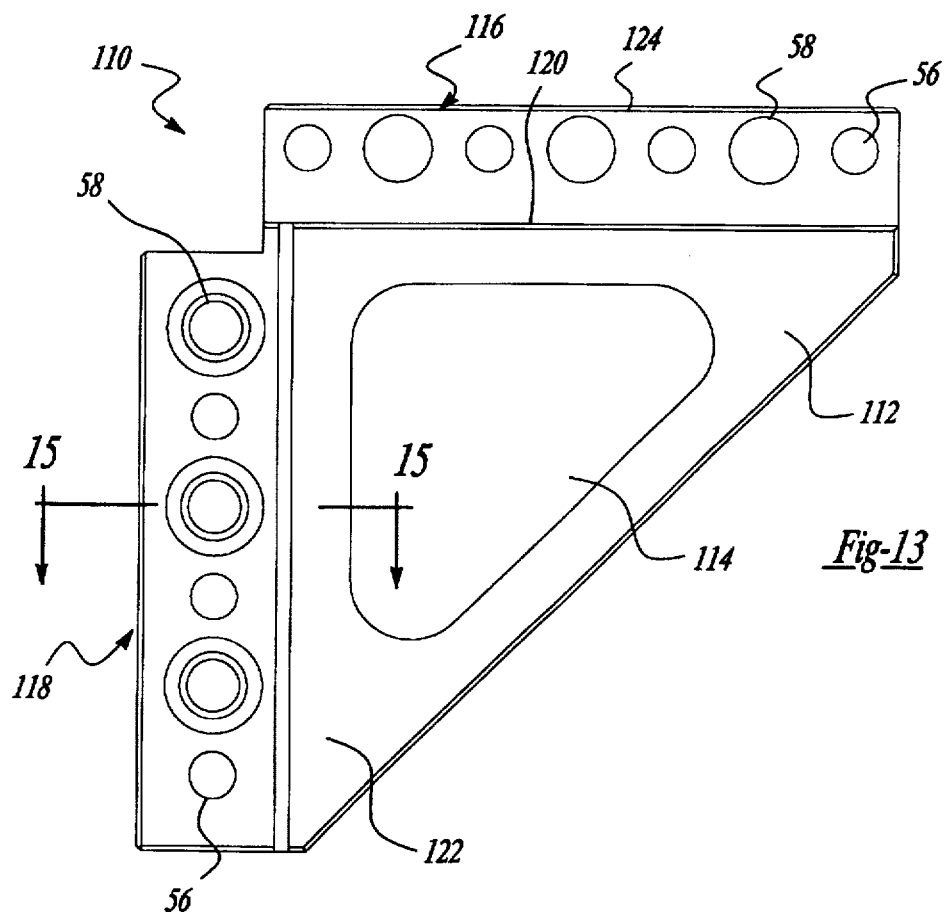
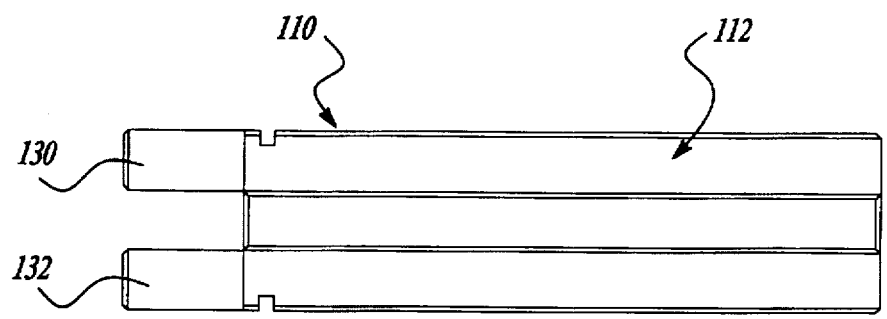
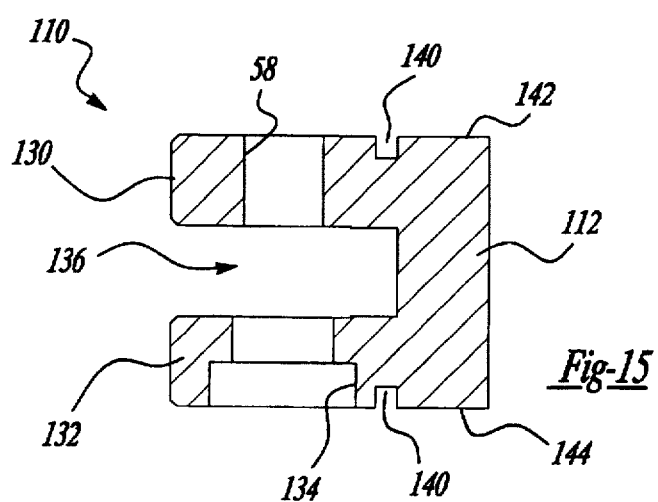
Fig-13
Fig-14
Fig-15

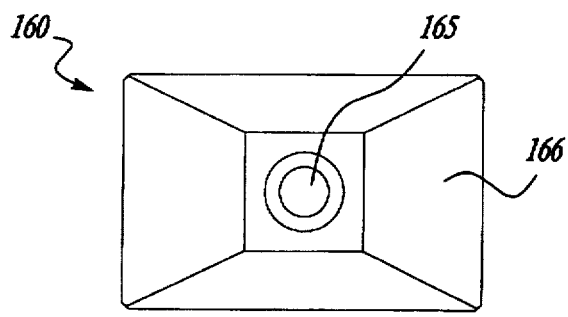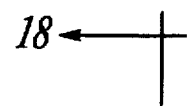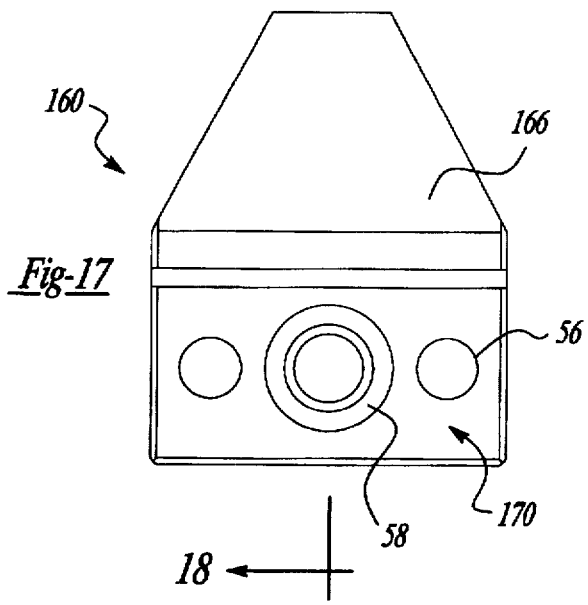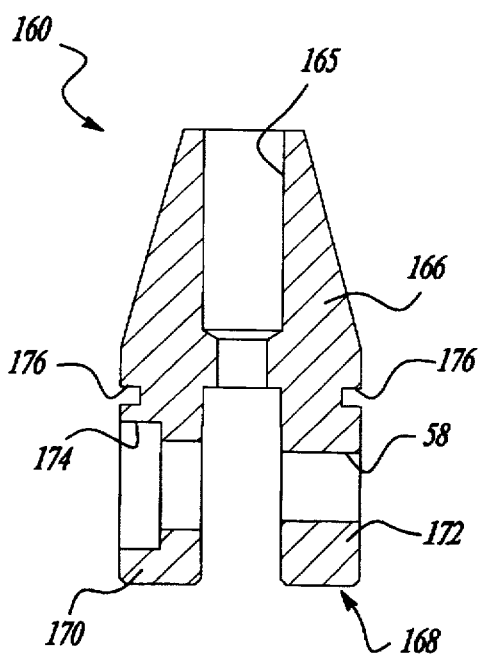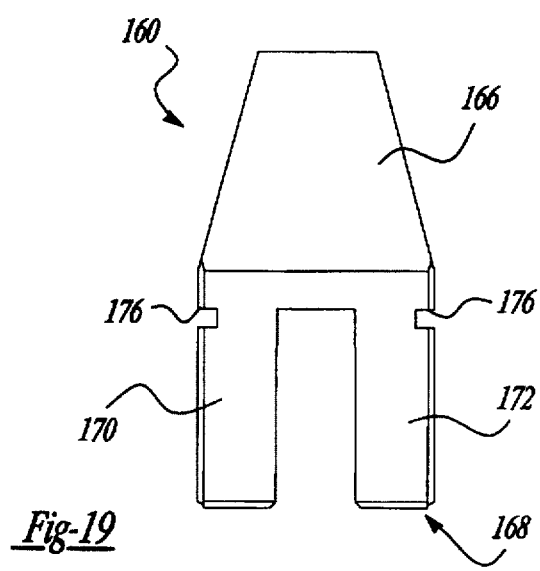

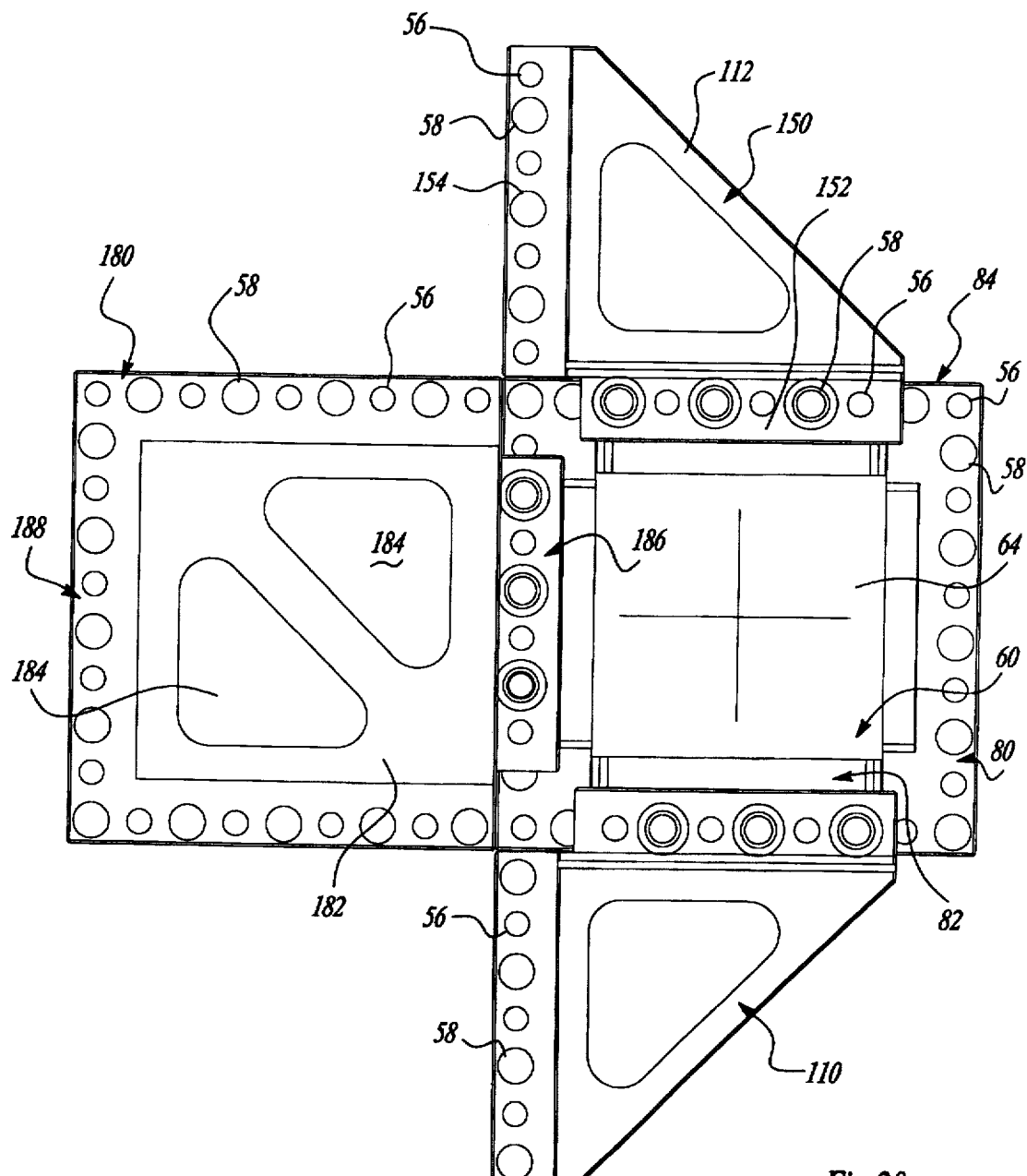

MODULAR TOOLING SYSTEM FOR USE WITH A GAUGING MACHINE

TECHNICAL FIELD

The present invention relates, in general, to the gauging of physical dimensions of manufactured products. More particularly, the present invention relates to a modular tooling system for use with a gauging machine. The modular tooling system includes a plurality of cooperating modular components which provide a significant degree of flexibility through various arrangements of the components.

BACKGROUND OF THE INVENTION

The gauging art is highly developed and has become very sophisticated in view of requirements for obtaining and maintaining precise dimensions and close tolerances in some manufactured products. For example, parts manufactured for automotive vehicle assembly require close tolerances and precise dimensions for achieving a final product of high quality. In order for quality control to be successful and profitable, it must be done quickly, frequently and at low cost.

Heretofore, the monitoring of quality control of a manufactured part has frequently been limited to a single inspection of a representative sample of the part due to the time and cost involved. It has been typical to spend a great deal of time to accomplish difficult positioning and inspection of manufactured parts. In addition, there has been a need for a very specialized knowledge and training to execute accurate gauging of manufactured parts. The building of gauges dedicated to a specific component configuration has generally proven to be cost prohibitive. Limited exceptions exist in circumstances involving very high volume production runs.

In general, conventional gauging machines are known to comprise a reference table on to which a part to be measured can be positioned, and at least one mobile member having a measuring head to which is fitted a stylus designed to intercept an outer surface portion of the part for measuring given dimensions of the part. The part is typically positioned relative to the reference table through supporting and clamping fixtures.

While prior known devices such as that discussed above have proven to be commercially acceptable, each is attendant with its drawbacks and inherent limitations. For example, prior known devices are limited in versatility to accommodate parts of various geometries. Other prior known devices are associated with increased manufacturing, maintenance and assembly costs. Prior known devices do not meet the requirements necessary for multiple specific applications.

Thus, there remains a need in the art for a modular system incorporating a plurality of modular components that releasably fasten together in various configurations according to the requirements necessary to gauge a particular part. Such a modular system would make it possible from a cost effective standpoint to use such a system for long production runs and short production runs alike.

SUMMARY OF THE INVENTION

It is a primary object of the present invention to eliminate the disadvantages associated with the prior art by providing a modular tooling system which makes it possible to easily and quickly switch from the gauging of one type of part to another.

It is another object of the present invention to provide a modular tooling system for use with a gauging machine which restricts the movement of a workpiece, provides accurate location, and gives maximum repeatability.

It is a further object of the present invention to provide a modular tool system for use with a gauging machine which includes a plurality of cooperating modules.

The present invention is specifically directed to an apparatus which overcomes the drawbacks of prior known devices by providing a system of modular components that is flexible enough to adapt to an infinite number of differently configured parts. The process of gauging parts through a system of modular components allows a machine operator to gauge the parts at a gauging machine quickly so that data may be collected and analyzed before the next part is manufactured. Lead time can be greatly decreased due to the modularity of the components and the system can be readily reconfigured to adapt to a new part, thereby eliminating the long tooling time associated with dedicated fixed position gauges.

In a first aspect, the apparatus of the present invention is directed to a modular tooling system for use with a gauging machine for measuring a workpiece. The modular tooling system includes a base adapter member, a plurality of modular components, and a workpiece engaging member. The base adapter member is provided for attachment to a support surface and includes a mounting portion and a male flange portion. In the preferred embodiment, the mounting portion and the male flange portion are disposed normal to one another. Each component of the plurality of modular components includes a male flange and a female flange. The female flange of each of the plurality of modular components is adapted to receive either the male flange of the base adapter member or the male flange of one of the other components plurality of modular components for releasable mounting thereto. The workpiece engaging member similarly includes a female flange adapted to receive either the male flange of the base adapter member of the male flange of one of the plurality of modular components.

In a second aspect, the apparatus of the present invention is similarly directed to a modular tooling system for use with a gauging machine for measuring a workpiece. The modular tooling system includes a central module adapter to be interconnected to a support surface. The central module is generally rectangular in construction and has a plurality of mutually perpendicular side surfaces. The modular tooling system further includes at least one base adapter for attachment to one of the side surfaces of the plurality of mutually perpendicular side surfaces. The at least one base adapter includes a mounting portion and a male flange portion disposed normal to one another. The modular tooling system further includes a plurality of modular components. Each component of the plurality of modular components includes a male flange and further including a female flange. The female flange of each of the plurality of modular components is adapted to receive the male flange of the base adapter or the male flange of one of the other plurality of modular components for releasable mounting thereto.

In the preferred embodiment, each of the male flanges and each of the female flanges is formed to include a standard hole pattern. In one application, the standard hole pattern includes alternating dowel pin holes and tapped holes. The dowel pin holes are adapted to receive a dowel pin in a conventional manner and locate parts to be connected. The tapped holes receive threaded fasteners for secure and releasable attachment of components. Further in the preferred embodiment, the plurality of modular components includes an angle adapter for extending the standard hole in a direction perpendicular to central module and an extension adapter for extending the standard hole pattern in a direction perpendicular to the central module and parallel to the central module.

Accordingly, a modular tooling system is provided which overcomes the disadvantages of the prior art.

BRIEF DESCRIPTION OF THE DRAWINGS

Further objects, features and advantages of the present invention will become apparent from analysis of the following written specification and the accompanying drawing and the appended claims in which:

FIG. 13 is a front view of the left angle adapter member of FIG. 2;

FIG. 14 is a top view of the left angle adapter member of FIG. 13;

FIG. 15 is a cross-sectional view taken through the line 15—15 of FIG. 14; and

FIG. 16 is a top view of the ball support member of FIG. 1 with the mounting ball removed;

FIG. 17 is a front view of the ball support member of FIG. 16;

FIG. 18 is a cross-sectional view taken through the line 18—18 of FIG. 17;

FIG. 19 is a side view of the ball support member of FIG. 16;

FIG. 20 a top view of a third exemplary arrangement of the modular tooling system of FIG. 1 illustrated to further include an extension adapter member.

DETAILED DESCRIPTION OF THE PREFERRED EMBODIMENT

Figure 1:
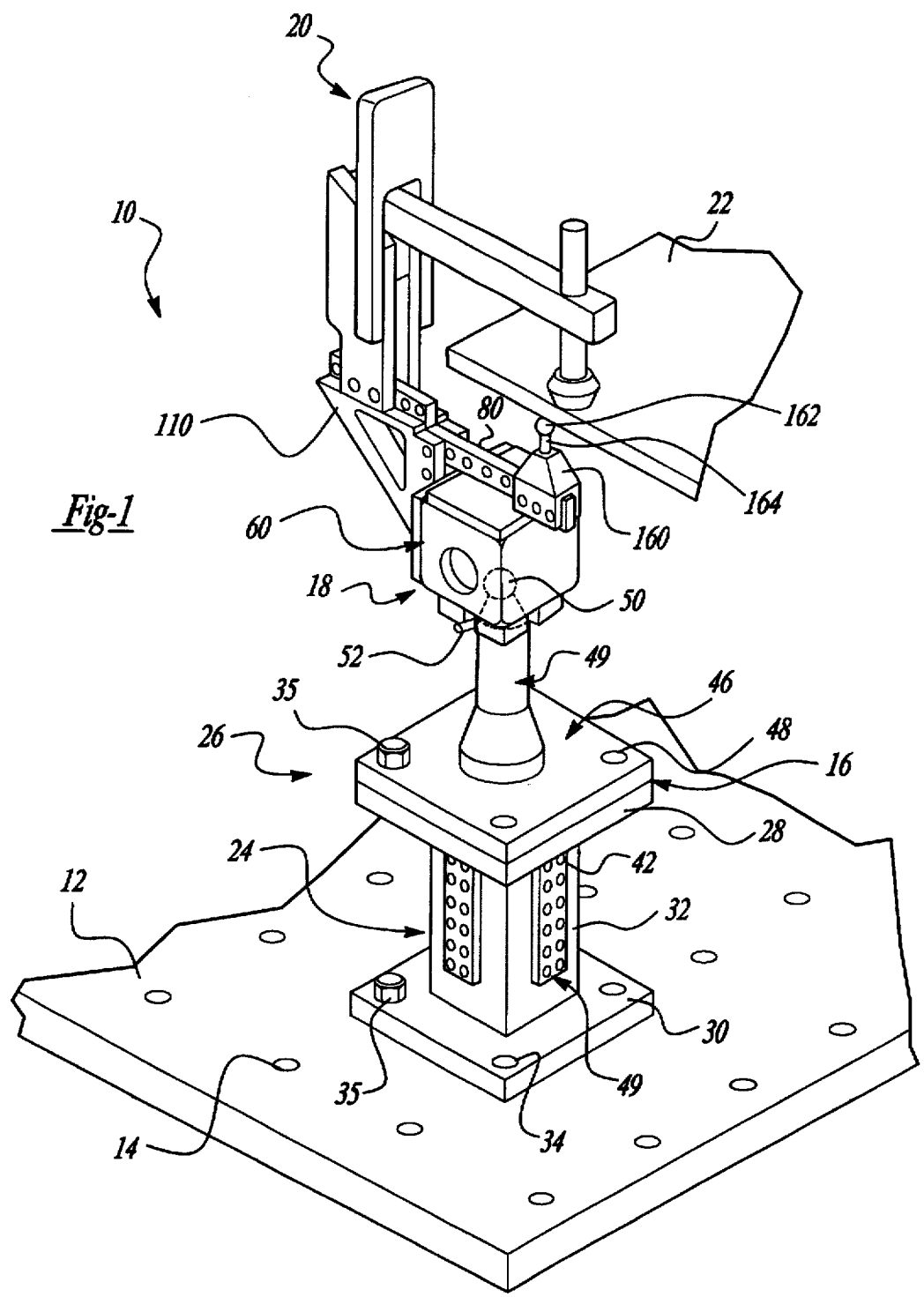
FIG. 1 is a perspective view illustrating a first exemplary arrangement of a modular tooling system constructed in accordance with the teachings of a first preferred embodiment of the present invention shown operatively associated with a mounting plate, a clamp and a workpiece.

The present invention provides a modular tooling system for use with a gauging machine. Before explaining a preferred embodiment of the present invention, it is to be understood that the invention is not so limited in application to the details of construction and the arrangements of the components set forth in the following description or illustrated in the drawings. The present invention is capable of other embodiments and of being practiced and carried out in different ways. It is also to be understood that the phraseology and terminology employed herein are for the purposes of description and should not be regarded as limiting.

Turning generally to the drawings, identical or equivalent elements have been denoted with like reference numerals. With specific reference to FIG. 1, a modular tooling system constructed in accordance with the teachings of a preferred embodiment of the present invention is generally indicated with reference numeral 10. As will be appreciated below, a major focus of the present invention is directed to a plurality of cooperating components which provide for versatility of placement of a locating sphere or a workpiece clamp. While each of the various components is novel in construction, it is anticipated that various changes thereto can be made without departing from the scope of the present invention. Further, it is anticipated that the plurality of cooperating components may incorporate additional components not shown and described herein depending on particular application requirements.

With continued reference to FIG. 1, the modular tooling system 10 of the present invention is shown mounted to a support surface in the form of a generally conventional reference table or mounting platen 12. The mounting platen 12 is shown to include a multiplicity of apertures 14 equally spaced in rows and columns about its entire surface. The modular tooling system 10 is further shown to include a base assembly 16 and a plurality of modular components 18 mounted to the base assembly 16. The plurality of modular components 18 illustrated in FIG. 1 are shown in an exemplary orientation arranged for supporting a substantially convention clamping device 20 in clamping arrangement with a workpiece 22.

The base assembly 16 is illustrated to include a stanchion 24 and an adapter module 26. The stanchion 24 preferably includes an upper mounting plate 28 and a lower mounting plate 30 interconnected by an intermediate portion 32. The lower mounting plate 30 is formed to include a plurality of apertures 34 arranged to align with two or more of the apertures 14 formed in the mounting platen 12. In a conventional manner, a threaded fastener 35 passes through one or more of the apertures 34 and engages one of the apertures 14 of the mounting platen 12.

While not specifically illustrated, it will be appreciated that the upper mounting plate 28 is similar formed to include a plurality of mounting apertures 34. The intermediate portion 32 is generally rectangular in cross-section. In the preferred embodiment, each of the four sides of the intermediate portion 32 includes an attachment member 40. As will be appreciated more fully below, various components of the plurality of modular components 18 can be affixed directly to the attachment members 40 of the stanchion 24. To this end, each of the attachment members 40 is shown to preferably incorporate a pair of rows of threaded apertures 42. Each aperture 42 is adapted to specifically receive a threaded fastener.

It will be appreciated by those skilled in the art that the relative dimensions of the stanchion 24 shown in FIG. 1 in relationship to the other components of the modular tooling system 10 of the present invention are merely exemplary. In this regard, such dimensions are subject to modification. For example, the height of the stanchion 24 can be easily varied.

With continued reference to FIG. 1, the adapter module 26 of the present invention is shown to include a mounting plate 46 having a plurality of apertures 48 adapted to align with the apertures (not shown) of the upper mounting plate 28 of the stanchion 24. The adapter module 26 is further shown to include an upwardly extending column portion 48 fixedly attached to the mounting plate 46. In the preferred embodiment, the upwardly extending column portion 48 upwardly terminates at a spherical mounting ball 50. In one application, the mounting ball 50 has a diameter of approximately one-half inch. **** Further in the preferred embodiment, the adapter module 26 includes a pair of outwardly extending locating arms 52. As illustrated, the locating arms 52 extend in opposite directions within a horizontal plane and are generally cylindrical in construction.

While not specifically illustrated, it will be appreciated by those skilled in the art that the base assembly 16 can additionally incorporate a two or three way translator for allowing fine adjustments of the adapter module 26 relative to the mounting platen 12. In particular, a two or three translator can be interdisposed between the upper mounting plate of the stanchion 24 and the mounting plate of the adapter module 26. A suitable translator is commercially available from Oriel Corporation of Stratford, Conn. as part numbers 16021, 16031, 16221, or 16231.

Before turning to the construction and operation of the specific modular components, it must first be appreciated that the modular tooling system 10 of the present invention incorporates a standard hole pattern for purposes of securing and locating the various components. In this regard, it will be understood that most of the various components incorporate a standard hole pattern of alternating dowel pin holes 56 and tapped holes 58. The dowel pin holes 56 are adapted to receive a dowel pin in a conventional manner and locate the parts to be connected. It will be appreciated by those skilled in the art that use of dowel pins provides more accuracy for locating, positioning, and holding workpieces 22. The tapped holes 58 are adapted to receive a threaded fastener for clamping of interconnected parts and for attachment of additional elements. In one application, the dowel pin holes 56 have a diameter of 0.1935 inch, the tapped holes 58 have a diameter of 0.281 inch, and the dowel pin holes 56 and tapped holes 58 lie on a common center line. However, it will be understood that the dimensions of the dowel pin holes 56 and tapped holes 58 is merely that of design choice. Further, specific applications may necessitate distinct centerlines for the tapped holes 58 and dowel pin holes 56. As will become more apparent below, alternating of the dowel pin holes 56 and the tapped holes 58 allows for a significant degree of flexibility.

With reference to FIGS. 1–6, the modular tooling system 10 is shown to include a central module 60. The central module 60 is specifically adapted to mount to the mounting ball 50 of the adapter module 26 and provides five mutually perpendicular faces, in the form of a top surface 64 and four side surfaces 66, for the releasable attachment of other components which will be discussed in detail below. In the preferred embodiment, the central module 60 is constructed of mild steel and is specifically designed to minimize overall weight while concurrently maximizing mounting flexibility. However it will be appreciate that aluminum or other suitable materials can be utilized.

Figure 4:
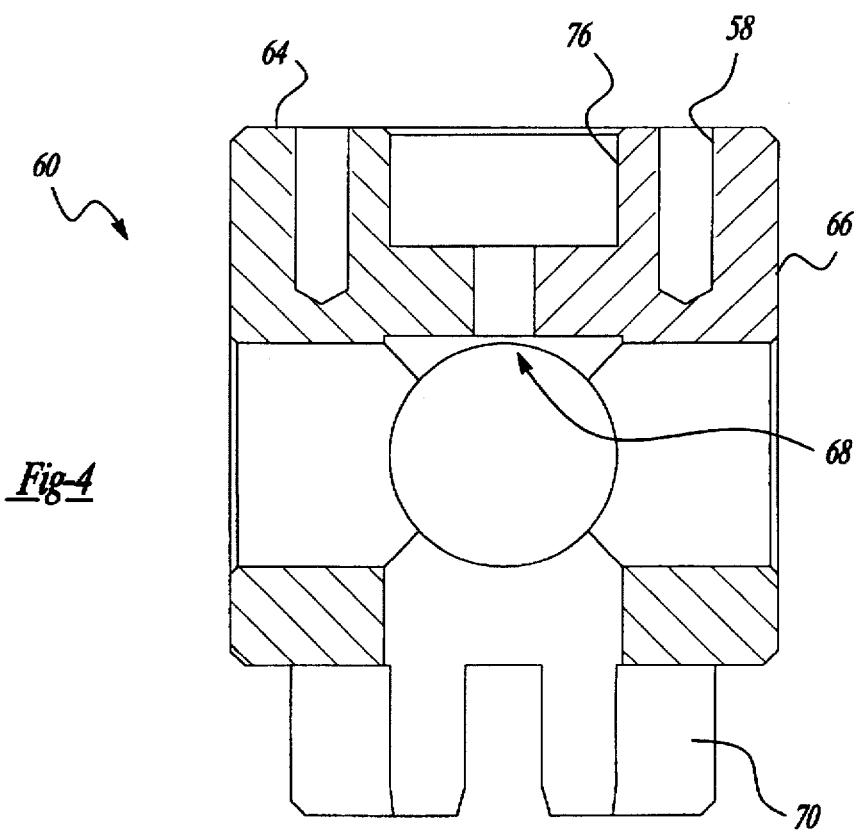
FIG. 4 is a cross-sectional view taken along the line 4—4 of FIG. 3.

As best shown in the cross-sectional view of FIG. 4, the central module 60 at least partially defines a central cavity 68 for receiving the mounting ball 50 of the adapter module 26. The central module 60 is further shown to include four downwardly extending leg portions 70 equally spaced thereabout. Adjacent a vertical center line of the central module 60, each of the downwardly extending leg portions is relieved along a common circle concentric with the vertical axis. Such a construction of the leg portions 70 permits the adapter module 26 to be inserted into the cavity 68. Upon such insertion, the locating arms 52 of the adapter module 26 are received between opposing pairs of the downwardly extending leg portions 70 to thereby rotationally locate the central module 60 relative to the adapter module 26.

Figure 5:
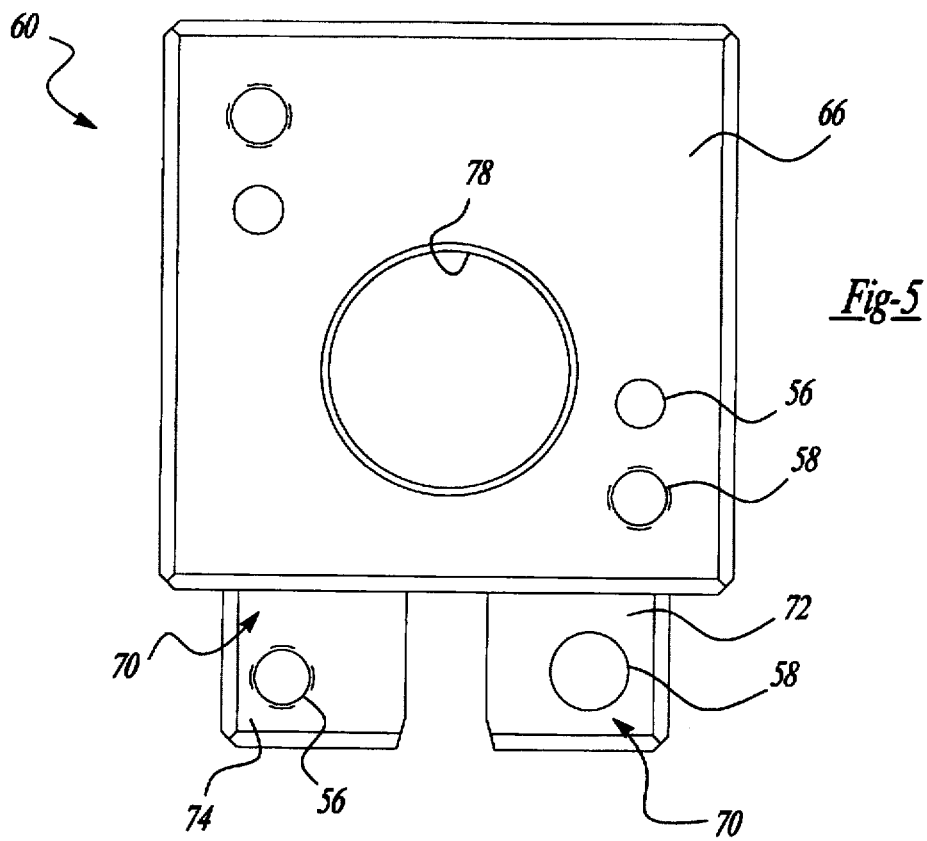
FIG. 5 is a front of the central module of FIG. 2.
Figure 6:
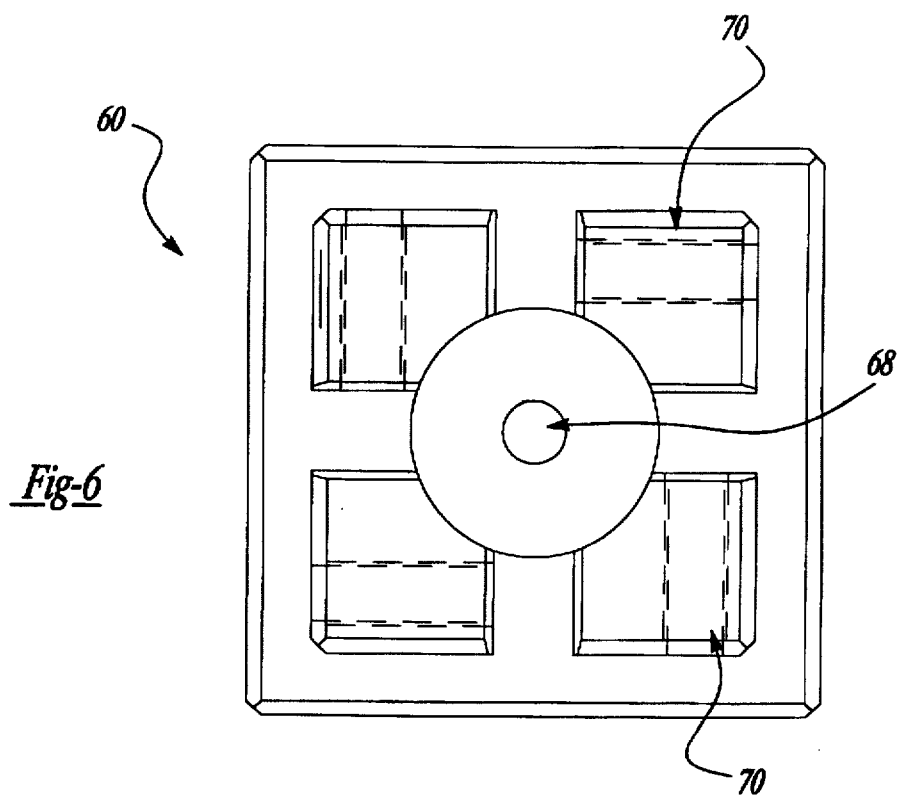
FIG. 6 is a bottom view of the central module of FIG. 2.

With reference to FIG. 5, each of the downwardly extending leg portions 70 is illustrated to include a first outwardly facing side 72 formed to include a tapped hole 58. Further, each downwardly extending leg portion 70 includes a second outwardly facing side 74 formed to include a dowel pin hole 56. The first and second outwardly facing sides 72 and 74 of the downwardly extending leg portions 70 are arranged such that they alternate about the central module 60 to provide for mutually perpendicular mounting surfaces each identically including a tapped hole 58 and a dowel pin hole 56.

Figure 3:
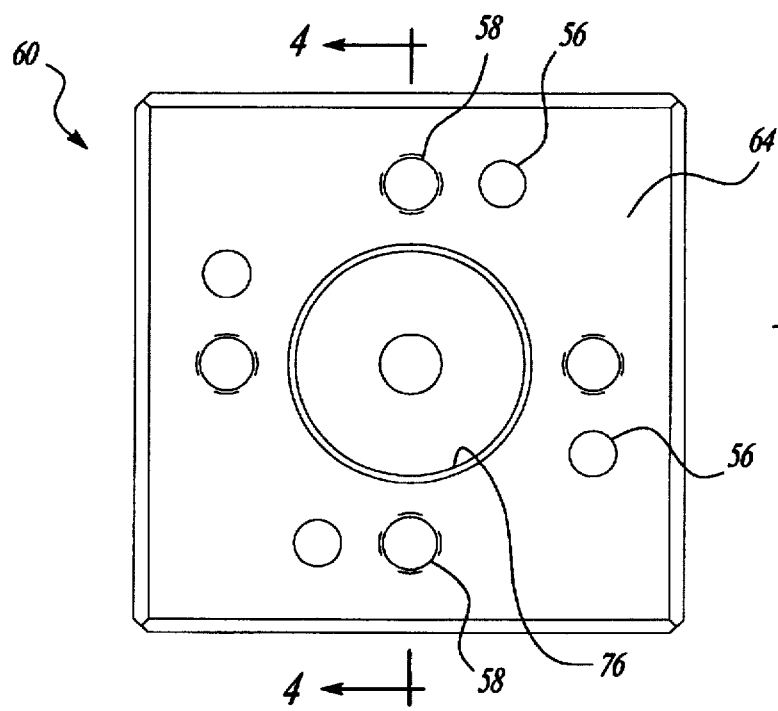
FIG. 3 is a top view of the central module of FIG. 1.

With specific reference now to FIGS. 3 and 4, the top surface 64 of the central module 60 is shown to include four tapped holes 58 equally spaced about the central vertical axis of the central module 60. In the embodiment illustrated, the tapped holes 58 are located at the mid-point of each of the four sides of the central modular 60. As further illustrated, a dowel pin hole 56 is located adjacent each tapped hole 58 on a common center line extending parallel to the adjacent side. For purposes of reducing the overall weight of the central module 60, a cylindrical bore 76 partially extends downwardly from the top surface 64.

With reference to FIG. 5, each side surface 66 of the central module 60 is shown to include a pair of tapped holes 58 and a pair of dowel pin holes 56. In the exemplary embodiment illustrated, the tapped holes 58 are located adjacent opposite corners, with a first of the tapped holes 58 adjacent a top left corner and a second of the tapped holes 58 adjacent a bottom right corner. A first of the dowel pin holes 56 is located immediately below the first tapped hole 58 and a second dowel pin hole 56 is located immediately above the second tapped hole 58. To further reduce the overall weight of the central module 60, an inwardly extending cylindrical bore 78 is formed on each of the side surfaces 66. The configuration of the central module 60 described above and illustrated in the drawings is merely exemplary. However, it will be appreciated by those skilled in the art that the configuration disclosed serves to maximize the mounting variations permitted while minimizing the overall weight thereof.

With continued reference to FIGS. 1 and 2 and additional reference to FIGS. 7–9, a first base adapter member 80 and a second base adapter member 82 of the present invention will now be described. While reading the description of the first and second base adapter members 80 and 82 which immediately follows, it should be appreciated that the intended purposes of these components is to extend the standard hole pattern described above perpendicular to a mounting surface of the central module 60.

Figure 2:
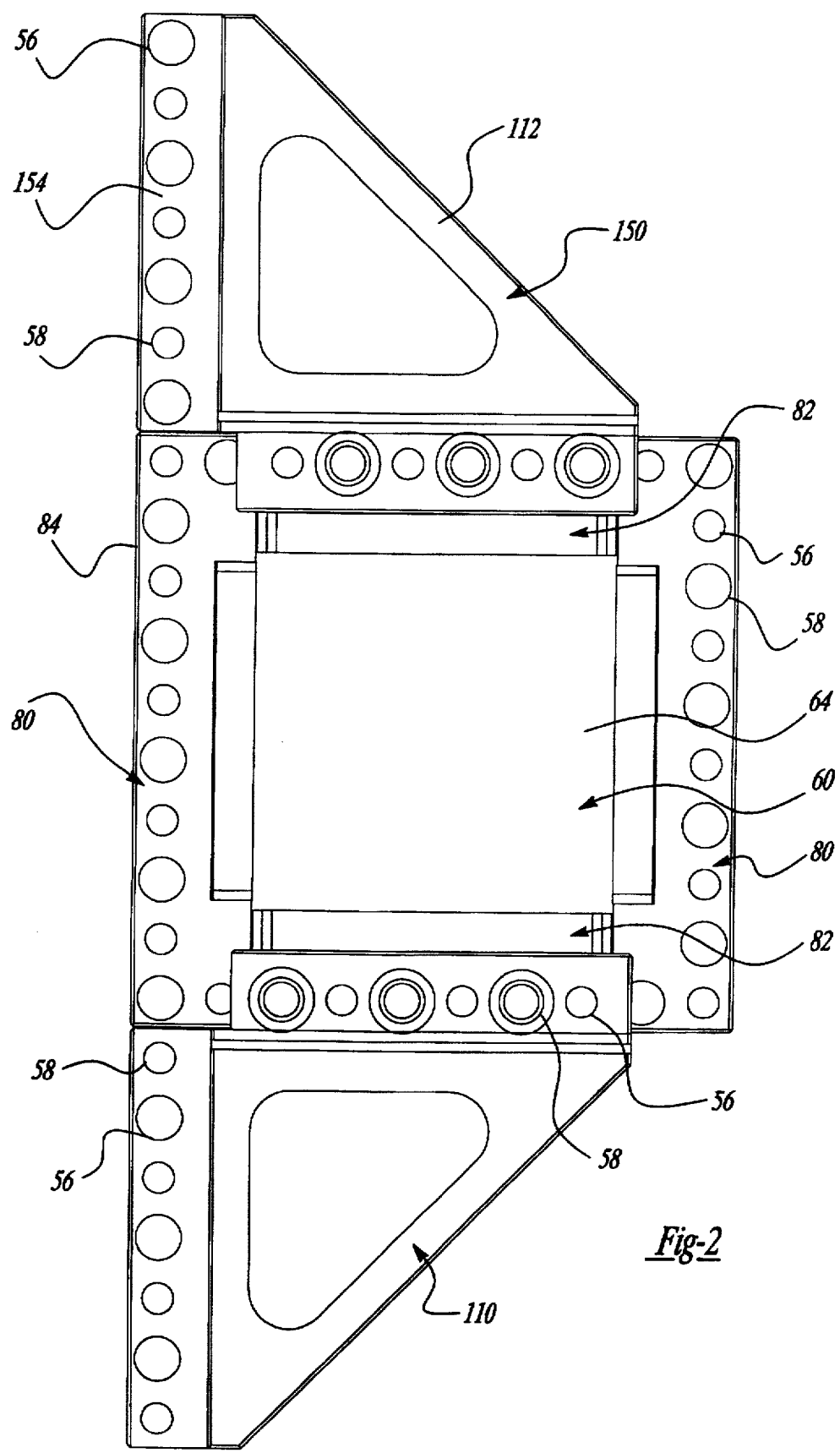
FIG. 2 is a top view of a second exemplary arrangement of the modular tooling system of FIG. 1.

As specifically shown in the exemplary arrangement of FIG. 2, the first and second base adapter members 80 and 82 cooperate to provide a peripheral mounting flange 84 which extends about the central module 60. In the exemplary arrangement of FIG. 2, the first and second base adapter members 80 and 82 form the peripheral mounting flange 84 in a horizonal plane. Alternatively, it will be appreciated that the first and second base adapter members 80 and 82 can be used independently and also that the first and second base adapter members 80 and 82 can be mounted to form a similar peripheral mounting flange 84 in a vertical plane. It will further be appreciated that the first and second base adapter members 80 and 82 may alternatively be mounted to the support platen 12 or to one or more of the attachment members 40 of the stanchion 24.

Figure 7:
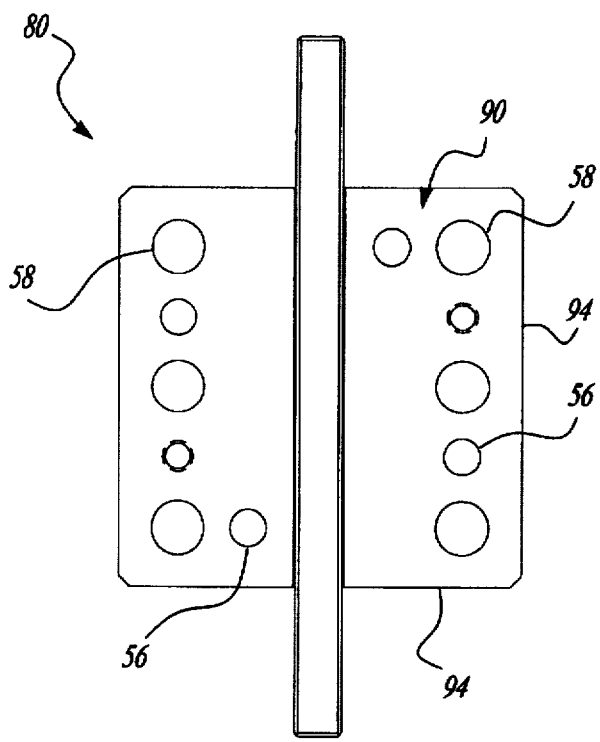
FIG. 7 is a top view of the first base adapter member of FIG. 2.
Figure 8:
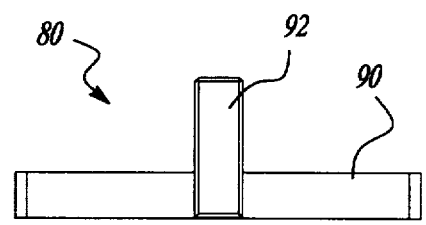
FIG. 8 is an end view of the first base adapter member of FIG. 7.
Figure 9:
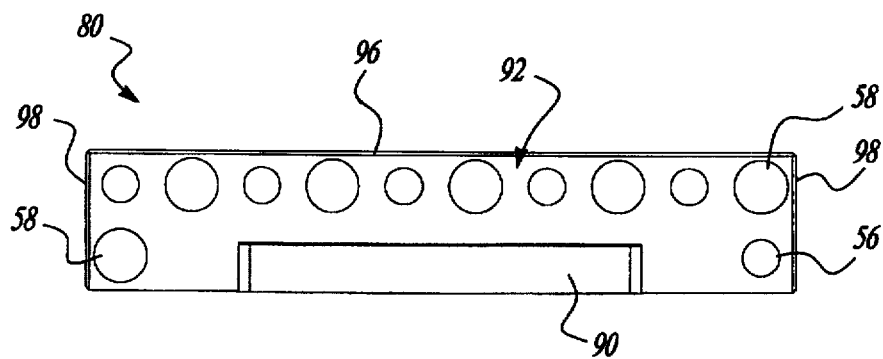
FIG. 9 is a side view of the first base adapter member of FIG. 7.

Turning first to FIGS. 7–9, the first base adapter member 80 is illustrated to include a mounting portion and a male flange portion 92. In the preferred embodiment, the mounting portion 90 and the male flange portion 92 are arranged perpendicular to each other. The mounting portion 90 is generally rectangular in construction and includes four sides 94 of substantially equal length. The mounting portion 90 is shown to include the standard hole pattern of the present invention disposed about a substantial portion of its perimeter. Specifically, two opposite sides 94 of the mounting portion 90 substantially identically include three tapped holes 58 interleaved by a pair of dowel pin holes 56. Two additional dowel pin holes 56 are provided adjacent two of the tapped holes 58 located in opposite corners of the first base adapter 80.

The male flange portion 92 is integrally formed with the first mounting portion 90 and is formed to include the standard hole pattern about three of its sides. As illustrated, the standard hole pattern is disposed adjacent an outer edge 96 beginning with a dowel pin hole 56 and terminates in a tapped hole 58. Along a pair of shorter sides 98, the standard hole pattern continues and includes one of a dowel pin hole 56 or a tapped hole 58.

In one exemplary use application, the mounting portion 90 is directly attached to the central module 60. In the exemplary arrangement illustrated in the top view of FIG. 2, a pair of first base adapter members 80 are shown mounted to the central module 60. To achieve the appropriate hole pattern, the first base adapter members 80 are rotated 180° relative to one another.

Figure 10:
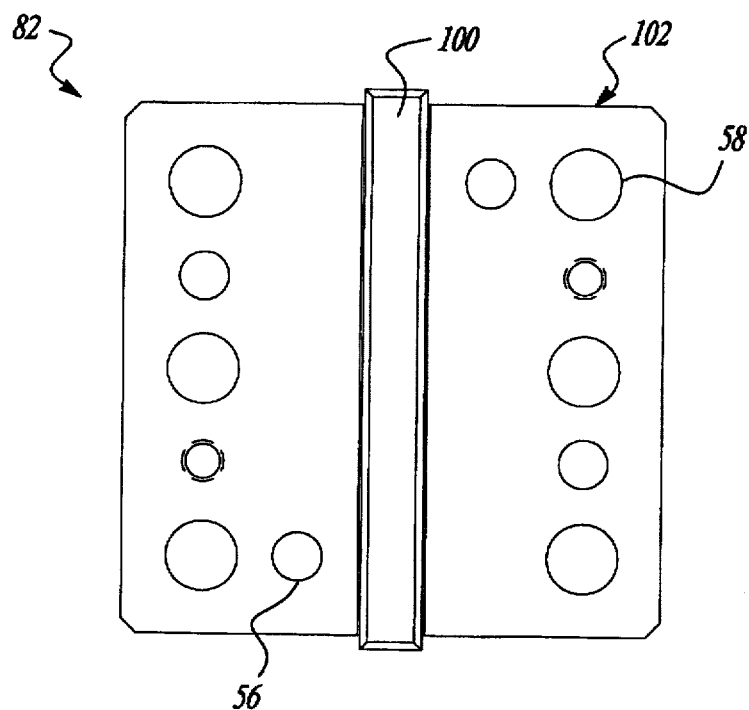
FIG. 10 is a top view of the second base adapter member of FIG. 2.
Figure 11:
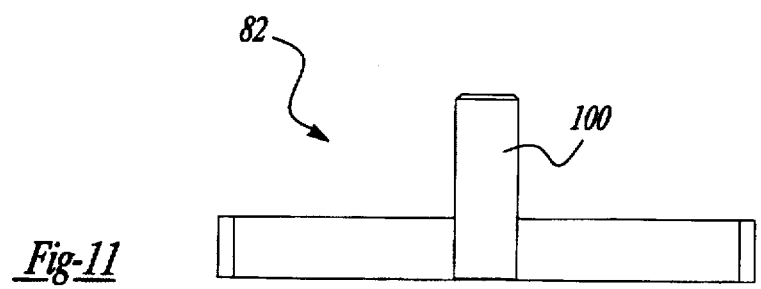
FIG. 11 is an end view of the second base adapter member of FIG. 10.
Figure 12:
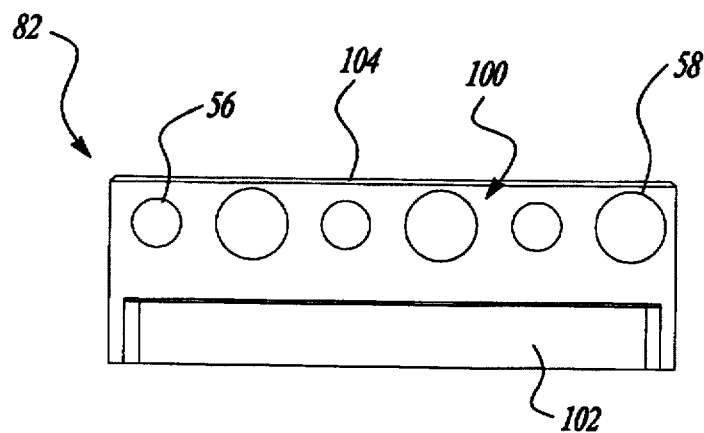
FIG. 12 is a side view of the base adapter member of FIG. 11.

With continued reference to FIG. 2 and additional reference to FIGS. 10–12, the second base adapter member 82 will be described. As briefly discussed above, the second base adapter member 82 is adapted to cooperate with the first base adapter members 80. As illustrated in the exemplary arrangement of FIG. 2, the second base adapter member 82 functions to complete the standard hole pattern about the perimeter of the central module 60. Similar to the first base adapter member 80, the second base adapter member 82 includes a male flange portion 100 arranged perpendicular to a mounting portion 102. The mounting portion 102 of the second base adapter 82 is substantially identical to the mounting portion 90 of the first base adapter member 80. The male flange portion 100 of the second base adapter member 82 is similar to the male flange portion 92 of the first base adapter member 80 but is shorter in length and only includes the standard hole pattern adjacent a first side thereof 104. Further, similar to the first base adapter 80, the male flange portion 100 of the second base adapter 82 includes a standard hole pattern which begins with a dowel pin hole 56 and terminates in a tapped hole 58, thereby providing additional versatility by rotating the part through 180°.

With reference now to FIGS. 2 and 13–15, a left angle adapter member 110 will now be described. The left angle adapter member 110 is shown to include a main body portion 112 generally constructed in the shape of a right triangle. A triangular aperture 114 is located so as to pass through the center of the main body portion 112 to thereby decrease the overall weight of the left angle adapter member 110.

With specific reference to FIG. 13, the left angle adapter member 110 is further shown to include a male flange member 110 and a female flange portion 118 formed adjacent the first and second perpendicularly oriented sides 120 and 122, respectively, of the main body portion 112 of the adapter member 110. The male flange portion 116 is shown to be of a single flange construction substantially identical to the male flange portion 100 of the second adapter member 82 and includes the standard hole pattern formed adjacent an outer edge 124. The standard hole pattern begins and terminates in a dowel pin hole 56.

With specific reference to FIGS. 14 and 15, the female flange portion 118 is shown to be of a double flange construction. In this regard, the female flange portion 118 includes an upper flange 130 arranged parallel and spaced apart from a lower flange 132. The standard hole pattern of the present invention passes through both the upper flange and lower flange 130 and 132. The tapped holes 58 of the lower flange 132 include a countersunk portion 134 to receive a threaded fastener (not shown). The upper and lower mounting flanges 130 and 132 partially define a channel 136 for receiving a flange-type structure such as the male flange portion 92 of the first base adapter 80, the male flange portion 100 of the second base adapter or any other similar single flange construction.

Further in the preferred embodiment, the main body portion 112 of the left angle adapter member 114 is shown to include a groove 140 in a top surface 142 and a bottom surface 144 extending adjacent the female flange portion 118. In the exemplary use illustrated in FIG. 2, a portion of the peripheral flange 84 defined by the pair of first base adapter members 80 and the pair of second base adapter members 82 is received by the channel 136 defined between the upper and lower flanges 130 and 132 of the female flange portion 118. The left angle adapter 110 can be translated along any of the four sides of the peripheral flange 84 and secured thereto in any position in which the corresponding standard hole pattern aligns.

While not illustrated, it will be appreciated by those skilled in the art that the left angle adapter member 110 can be positioned such that a portion of the female flange portion 118 extends beyond the peripheral flange 84. To secure and locate the left angle adapter member 110, a dowel pin (not shown) is passed through aligning dowel pin holes 56 and a threaded fastener (not shown) is passed through aligning tapped holes 58. In this regard, the head of the fastener is received into the countersunk portion 134 in the lower flange 132. Upon tightening of the threaded fastener, slight inward flexing of the upper and lower flanges 130 and 132 of the female flange portion 118 is permitted by the grooves 140 provided in the main body portion 112 of the left angle adapter 110. This slight flexing serves to effectively "pinch" the mounting flange received within the channel 136. Through use of the left angle adapter 110, the standard hole pattern of the present invention is extended in a direction perpendicular to the standard hole pattern of the peripheral flange 84.

With continued reference to FIG. 2, the plurality of modular components 18 of the present invention is further shown to include a right angle adapter member 150 similar in construction to the left angle adapter member 110. The only difference between the left angle adapter member 110 and the right angle adapter member 150 is the hole pattern located in the corresponding male and female flange portions. In this regard, the hole pattern of a female flange portion 142 of the right angle adapter member 150 terminates adjacent the right angle of the main body portion 112 in a tapped hole 58. Further, the standard hole pattern of the male flange portion 154 terminates adjacent the right angle of the main body portion 112 in a dowel pin hole 56.

In many application, only a single angle adapter member (either the left angle adapter member 110 or the right angle adapter member 150) will be required due to the inherent flexibility provided by "flipping" the component over. However, in certain application, it will.. be desirable to align the standard hole pattern of the male flange portion 116 or 154 of either of the angle adapter members 110 or 150 so as to continue the standard hole pattern of the peripheral flange 84 in a linear direction. As a result, another component (e.g., a left angle adapter member 110, a right angle adapter member 150 or the like) can be mounted to the mounting surface cooperatively defined by the peripheral mounting flange 84 and the male flange portion of the angle adapter member 110 or 150.

With continued reference to FIG. 1 and additional reference to FIGS. 16–19, a ball support member 160 of the present invention will now be described. The ball support member 160 includes a generally spherical mounting ball 162 integrally attached to a cylindrical shaft 164. The cylindrical shaft 164 is received by a vertical aperture 165 located in a main body portion 166. In one application the cylindrical mounting ball 162 has a diameter of approximately one-half inch. However, those skilled in the art will readily appreciate that any of a number of diameters will be suitable for engaging the workpiece 22.

With continued reference to FIGS. 16–19, the ball support member is shown to include a female flange portion 168 having a dual-type flange construction similar to the construction of the female flange portion of the left angle adapter member 110. The female flange portion of the ball support member 160 includes a first flange 170 and a second flange 172, each of which are formed with the standard hole pattern passing therethrough. In the exemplary embodiment illustrated, the hole pattern begins and terminates in a dowel pin hole 56 with a single tapped hole 58 located in the horizontal center of each of the first and second flanges 170 and 172. The tapped hole 58 of the first flange 170 is formed to include a countersunk portion 174 for receiving the head of a threaded fastener (not shown). Further, in the embodiment illustrated, the mounting portion 168 of the ball support member 160 include a pair of horizontally disposed grooves 176 formed immediately adjacent the first and second flange portion 170 and 172. As discussed above, when a threaded fastener is passed through the tapped hole 58, the tightening of the threaded fastener serves to inwardly flex the first and second flanges 170 and 172. The ball support member 160 is specifically adapted to be mounted to any of the male flange portions provided by the other components described above.

With reference to FIG. 20, the plurality of module components of the present invention is further shown to include a right extension adapter member 180. The right extension adapter member 180 includes a main body portion 182 of generally rectangular construction formed with a pair of triangular apertures 184 passing therethrough for purposes of overall part weight reduction. The extension adapter member 180 is further illustrated to include a female flange portion 186 having the dual-type flange construction discussed above and adapted to mountably engage the single flange construction of the peripheral flange 84, the left angle adapter member 110, the right angle adapter member 150, or the like. In the embodiment illustrated, the female flange portion 186 includes a standard hole pattern which begins at one end with a tapped hole 58 and terminates at another end with a dowel pin hole 56. A male flange portion 188 having a single flange construction similar to that discussed above extends about the perimeter of the remaining three sides of the extension adapter member 180.

While not specifically illustrated, it will be appreciated that the female flange portion 186 of the extension adapter member 180 includes countersunk tapped holes 58 and grooves which permit flexing of the flanges similar to the dual-type flange construction discussed above with respect to the ball support member 160 and the left and right angle adapter members 110 and 150.

As illustrated, the standard hole pattern provided in the remaining three sides of the extension adapter member 180 are arranged to continue the standard hole pattern provided by the peripheral flange 84. Opposite to that shown in FIG. 20, the extension adapter member 180 can be used on the opposing side of the peripheral flange 84 by merely "flipping" the adapter member over. In use, the extension adapter member 180 extends the standard hole pattern in a direction generally perpendicular to the central module 60. Also, the extension adapter member 180 serves to provide a standard hole pattern parallel to and spaced apart from one of the faces of the central module 60.

In the preferred embodiment, each of the plurality of modular components is similarly constructed of mild steel. However, it will be appreciated by those skilled in the art that other materials of suitable strength may be substituted.

While the specific embodiments of the invention have been shown and described in detail to illustrate the principles of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as defined in the following claims. For example, it will be appreciated that modular components of varying configurations can be substituted without departing from the present invention.

What is claimed:

1. A modular tooling system for supporting a workpiece, the modular tooling system comprising:
   a mounting element including a female flange portion and a male flange portion;
   at least one modular component including a male flange portion and a female flange portion;
   said female flange portion of said at least one modular component being adapted to selectively receive said male flange portion of said mounting element for releasable mounting thereto; and
   whereby said at least one modular component is selectively arrangeable to support the workpiece.

2. The modular tooling system of claim 1, wherein said mounting element further includes a base portion disposed perpendicular to said male flange portion.

3. The modular tooling system of claim 2, further comprising a central module having a generally rectangular construction and including a plurality of mutually perpendicular side surface, said mounting element adapted to releasably engage one of said plurality of mutually perpendicular side surfaces.

4. The modular tooling system of claim 3, wherein said plurality of mutually perpendicular side surfaces each includes a threaded aperture.

5. The modular tooling system of claim 4 further comprising an upwardly extending column portion including an upper end having a mounting sphere, and further wherein said central module includes a generally spherical cavity for receiving said mounting sphere.

6. The mounting tooling system of claim 5, wherein said central module further includes a plurality of downwardly extending leg portions, and further wherein said column portion includes at least one outwardly extending arm adapted to be received interbetween a pair of adjacent leg portions.

7. The mounting tooling system of claim 6, further comprising a stanchion having an upper end interconnected with said column portion and a central portion having a plurality of mounting surfaces.

8. The modular tooling system of claim 1, wherein each of said male flange portions and each of said female flange portions is formed to include a repetitive hole pattern alternating between a tapped hole and a dowel pin hole, said tapped hole adapted to receive a fastener and said dowel pin hole adapted to receive a dowel pin.

9. The modular tooling system of claim 1, further comprising:
- a workpiece support member including a female flange portion and a workpiece engaging portion, said female flange portion of said workpiece support member being adapted to selectively receive said male flange portion of said mounting surface and said male flange portions of each of said plurality of modular components.

10. A modular tooling system for use with a gauging machine for measuring a workpiece, the modular tooling system comprising:
- a central module having a generally rectangular construction and including a plurality of mutually perpendicular side surfaces at least one of said plurality of mutually perpendicular side surfaces including a male flange portion extending perpendicular thereto;
- a first modular component including a male flange portion and a female flange portion;
- a second modular component including a male flange portion and a female flange portion;
- said female flange portion of each of both of said first and second modular components being adapted to selectively receive said male flange portion of said mounting member and said male flange portion of said other modular component for releasable mounting thereto; and
- a workpiece support member including a female flange portion and a workpiece engaging portion, said female flange portion of said workpiece support member being adapted to selectively receive said male flange portion of said mounting surface and said male flange portions of each of said first and second modular components;
- whereby said plurality of modular components are selectively are arrangeable to accommodate the workpiece.

11. The modular tooling system of claim 10, further comprising at least one mounting element including a base portion adapted to releasably attach to one of said plurality of mutually perpendicular side surfaces.

12. The modular tooling system of claim 11, wherein said plurality of mutually perpendicular side surfaces each includes a threaded aperture.

13. The modular tooling system of claim 12 further comprising an upwardly extending column portion including an upper end having a mounting sphere, and further wherein said central module includes a generally spherical cavity for receiving said mounting sphere.

14. The mounting tooling system of claim 13, wherein said central module further includes a plurality of downwardly extending leg portions, and further wherein said column portion includes at least one outwardly extending arm adapted to be received interbetween a pair of adjacent leg portions.

15. The mounting tooling system of claim 14, further comprising a stanchion having an upper end interconnected with said column portion and a central portion having a plurality of mounting surfaces.

16. The modular tooling system of claim 10, wherein each of said male flange portions and each of said female flange portions is formed to include a repetitive hole pattern alternating between a tapped hole and a dowel pin hole, said tapped hole adapted to receive a fastener and said dowel pin hole adapted to receive a dowel pin.

17. A modular tooling system for use with a gauging machine for measuring a workpiece, the modular tooling system comprising:
- a central module adapted to be interconnected to a support surface, said central module generally rectangular in construction and including a plurality of mutually perpendicular side surfaces;
- at least one base adapter member for attachment to one of said side surfaces of said plurality of mutually perpendicular side surfaces, said at least one base adapter including a mounting portion and a male flange portion disposed normal to one another;
- a first modular component including a male flange portion and a female flange portion;
- a second modular component including a male flange portion and a female flange portion;
- said female flange portion of each of both of said first and second modular components being adapted to selectively receive said male flange portion of said mounting member and said male flange portion of said other modular component for releasable mounting thereto; and
- a workpiece support member including a female flange portion and a workpiece engaging portion, said female flange portion of said workpiece support member being adapted to selectively receive said male flange portion of said mounting surface and said male flange portions of each of said first and second modular components;
- whereby said first and second modular components are selectively arrangeable to accommodate the workpiece.

18. The modular tooling system of claim 17 further comprising an upwardly extending column portion including an upper end having a mounting sphere, and further wherein said central module includes a generally spherical cavity for receiving said mounting sphere.

19. The mounting tooling system of claim 18, wherein said central module further includes a plurality of downwardly extending leg portions, and further wherein said column portion includes at least one outwardly extending arm adapted to be received interbetween a pair of adjacent leg portions.

20. The mounting tooling system of claim 19, further comprising a stanchion having an upper end interconnected with said column portion and a central portion having a plurality of mounting surfaces.

\* \* \* \* \*